(12) United States Patent
Dias et al.

(10) Patent No.: US 10,931,630 B2
(45) Date of Patent: Feb. 23, 2021

(54) SYSTEM AND METHOD FOR CONNECTING USING ALIASES

(71) Applicant: ServiceNow, Inc., Santa Clara, CA (US)

(72) Inventors: Rebecca Dias, Kirkland, WA (US); Venkata Kiran Kumar Koya, San Diego, CA (US); Bryan Mather Barnard, Chicago, IL (US); Vincent Seguin, Encitas, CA (US); Jun Zhou, San Diego, CA (US); Hardik Modi, San Diego, CA (US); Gopalakrishnan Venkatachalam, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 218 days.

(21) Appl. No.: 15/815,418

(22) Filed: Nov. 16, 2017

(65) Prior Publication Data
US 2019/0149511 A1 May 16, 2019

(51) Int. Cl.
*H04L 29/12* (2006.01)
*H04L 29/06* (2006.01)
*H04L 29/08* (2006.01)
*H04L 12/12* (2006.01)
*G06F 9/54* (2006.01)

(52) U.S. Cl.
CPC ............... *H04L 61/30* (2013.01); *G06F 9/54* (2013.01); *H04L 12/12* (2013.01); *H04L 63/08* (2013.01); *H04L 67/141* (2013.01); *H04L 67/146* (2013.01); *H04L 67/16* (2013.01); *H04L 67/02* (2013.01); *H04L 67/06* (2013.01)

(58) Field of Classification Search
CPC ....... H04L 61/30; H04L 67/146; H04L 12/12; H04L 67/16; H04L 67/141; H04L 63/08; H04L 67/06; H04L 67/02; G06F 9/54
See application file for complete search history.

(56) References Cited

U.S. PATENT DOCUMENTS

| | | | | |
|---|---|---|---|---|
| 5,500,852 A | * | 3/1996 | Riley | H04L 29/06 340/9.1 |
| 5,534,855 A | * | 7/1996 | Shockley | G06F 21/31 340/5.52 |
| 5,548,722 A | * | 8/1996 | Jalalian | H04L 29/12113 709/220 |
| 5,764,906 A | * | 6/1998 | Edelstein | H04L 29/06 709/219 |
| 6,092,204 A | * | 7/2000 | Baker | G01R 33/4833 726/5 |
| 6,321,229 B1 | | 11/2001 | Goldman et al. | |
| 6,457,060 B1 | * | 9/2002 | Martin | G06F 16/9566 709/245 |
| 6,799,189 B2 | | 9/2004 | Huxoll | |
| 6,816,898 B1 | | 11/2004 | Garg et al. | |

(Continued)

*Primary Examiner* — Oleg Korsak
*Assistant Examiner* — Nhan Huu Nguyen
(74) *Attorney, Agent, or Firm* — Fletcher Yoder PC

(57) ABSTRACT

Systems, methods, and media for connecting using aliases. During operation, such as an API, an operation is called that utilizes a connection to a remote device. When this operation is attempted, information may be requested to complete the connection. The information may include credentials or connection information about a target device for the connection. An appropriate alias is used to request the suitable information.

20 Claims, 11 Drawing Sheets

(56) References Cited

U.S. PATENT DOCUMENTS

| | | | | |
|---|---|---|---|---|
| 6,895,586 | B1 | 5/2005 | Brasher et al. | |
| 7,020,706 | B2 | 3/2006 | Cates | |
| 7,027,411 | B1 | 4/2006 | Pulsipher | |
| 7,130,263 | B1 * | 10/2006 | Ong | H04J 3/085 370/223 |
| 7,284,232 | B1 * | 10/2007 | Bates | G06F 16/9562 717/100 |
| 7,363,347 | B2 * | 4/2008 | Thomas | H04L 67/14 709/217 |
| 7,392,300 | B2 | 6/2008 | Anantharangachar | |
| 7,617,073 | B2 | 11/2009 | Trinon | |
| 7,685,167 | B2 | 3/2010 | Mueller | |
| 7,716,353 | B2 | 5/2010 | Golovinsky | |
| 7,769,718 | B2 | 8/2010 | Murley | |
| 7,890,802 | B2 | 2/2011 | Gerber | |
| 7,925,981 | B2 | 4/2011 | Pourheidari | |
| 7,933,927 | B2 | 4/2011 | Dee | |
| 7,945,860 | B2 | 5/2011 | Vambenepe | |
| 8,082,222 | B2 | 12/2011 | Rangarajan | |
| 8,302,161 | B2 * | 10/2012 | Burch | H04L 63/0407 709/217 |
| 8,380,645 | B2 | 2/2013 | Kowalski | |
| 8,402,127 | B2 | 3/2013 | Solin | |
| 8,554,750 | B2 * | 10/2013 | Rangarajan | G06F 16/2365 707/694 |
| 8,583,750 | B1 * | 11/2013 | Hewinson | G06Q 10/107 709/206 |
| 8,612,408 | B2 * | 12/2013 | Trinon | G06F 9/542 707/705 |
| 8,646,093 | B2 | 2/2014 | Myers | |
| 8,744,995 | B1 * | 6/2014 | Hewinson | G06F 16/313 707/603 |
| 8,745,040 | B2 | 6/2014 | Kowalski | |
| 8,812,539 | B2 | 8/2014 | Milousheff | |
| 8,818,994 | B2 | 8/2014 | Kowalski | |
| 8,832,652 | B2 | 9/2014 | Mueller | |
| 8,886,750 | B1 * | 11/2014 | Mutz | H04L 61/1511 709/217 |
| 9,015,188 | B2 | 4/2015 | Behne | |
| 9,037,536 | B2 | 5/2015 | Vos | |
| 9,065,783 | B2 | 6/2015 | Ding | |
| 9,098,322 | B2 | 8/2015 | Apte | |
| 9,122,552 | B2 | 9/2015 | Whitney | |
| 9,137,115 | B2 | 9/2015 | Mayfield | |
| 9,317,327 | B2 | 4/2016 | Apte | |
| 9,323,801 | B2 | 4/2016 | Morozov | |
| 9,363,252 | B2 | 6/2016 | Mueller | |
| 9,412,084 | B2 | 9/2016 | Kowalski | |
| 9,467,344 | B2 | 10/2016 | Gere | |
| 9,535,737 | B2 | 1/2017 | Joy | |
| 9,613,070 | B2 | 4/2017 | Kumar | |
| 9,659,051 | B2 | 4/2017 | Hutchins | |
| 9,645,833 | B2 | 5/2017 | Mueller | |
| 9,654,473 | B2 | 5/2017 | Miller | |
| 9,766,935 | B2 | 9/2017 | Kelkar | |
| 9,792,387 | B2 | 10/2017 | George | |
| 9,805,322 | B2 | 10/2017 | Kelkar | |
| 9,852,165 | B2 | 12/2017 | Morozov | |
| 10,002,203 | B2 | 6/2018 | George | |
| 2007/0100868 | A1 * | 5/2007 | Hackmann | G06F 16/252 |
| 2009/0327502 | A1 * | 12/2009 | Brewer | H04L 63/10 709/229 |
| 2010/0077053 | A1 * | 3/2010 | Haffner | H04L 51/28 709/206 |
| 2010/0085959 | A1 * | 4/2010 | Vohra | H04L 65/403 370/352 |
| 2010/0235387 | A1 * | 9/2010 | Ong | G06F 16/9566 707/769 |
| 2011/0093937 | A1 * | 4/2011 | Mantle | G06F 21/6218 726/6 |
| 2013/0290547 | A1 * | 10/2013 | Berkema | H04L 67/14 709/227 |
| 2014/0317181 | A1 * | 10/2014 | Lin | H04L 67/1025 709/203 |
| 2016/0337345 | A1 * | 11/2016 | Barry | H04L 63/0853 |
| 2017/0295138 | A1 * | 10/2017 | Shastry | G06F 21/6245 |
| 2017/0300687 | A1 * | 10/2017 | Cherukuri | G06F 21/45 |
| 2017/0351443 | A1 * | 12/2017 | Candelaria | G06F 3/067 |
| 2018/0034923 | A1 * | 2/2018 | Mendonca | H04L 41/12 |
| 2018/0053182 | A1 * | 2/2018 | Mokhasi | G06Q 20/385 |
| 2018/0295135 | A1 * | 10/2018 | Feijoo | H04L 63/10 |

* cited by examiner

SYSTEM AND METHOD FOR CONNECTING USING ALIASES

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Computer resources hosted in distributed computing (e.g., cloud-computing) environments may be disparately located with each having its own functions, properties, and/or permissions. Such resources may include hardware resources, such as computing devices, switches, and the like. Additionally or alternatively, the resources may include software resources, such as database applications, application programming interfaces (APIs), and the like. However, these resources may have different requirements and/or methods of use. Also, due to disparate locations, these resources may utilize remote management to perform various functions on and/or with the resources.

BRIEF DESCRIPTION OF THE DRAWINGS

The description herein makes reference to the accompanying drawings, wherein like reference numerals refer to like parts throughout the several views.

DETAILED DESCRIPTION

Figure 1:
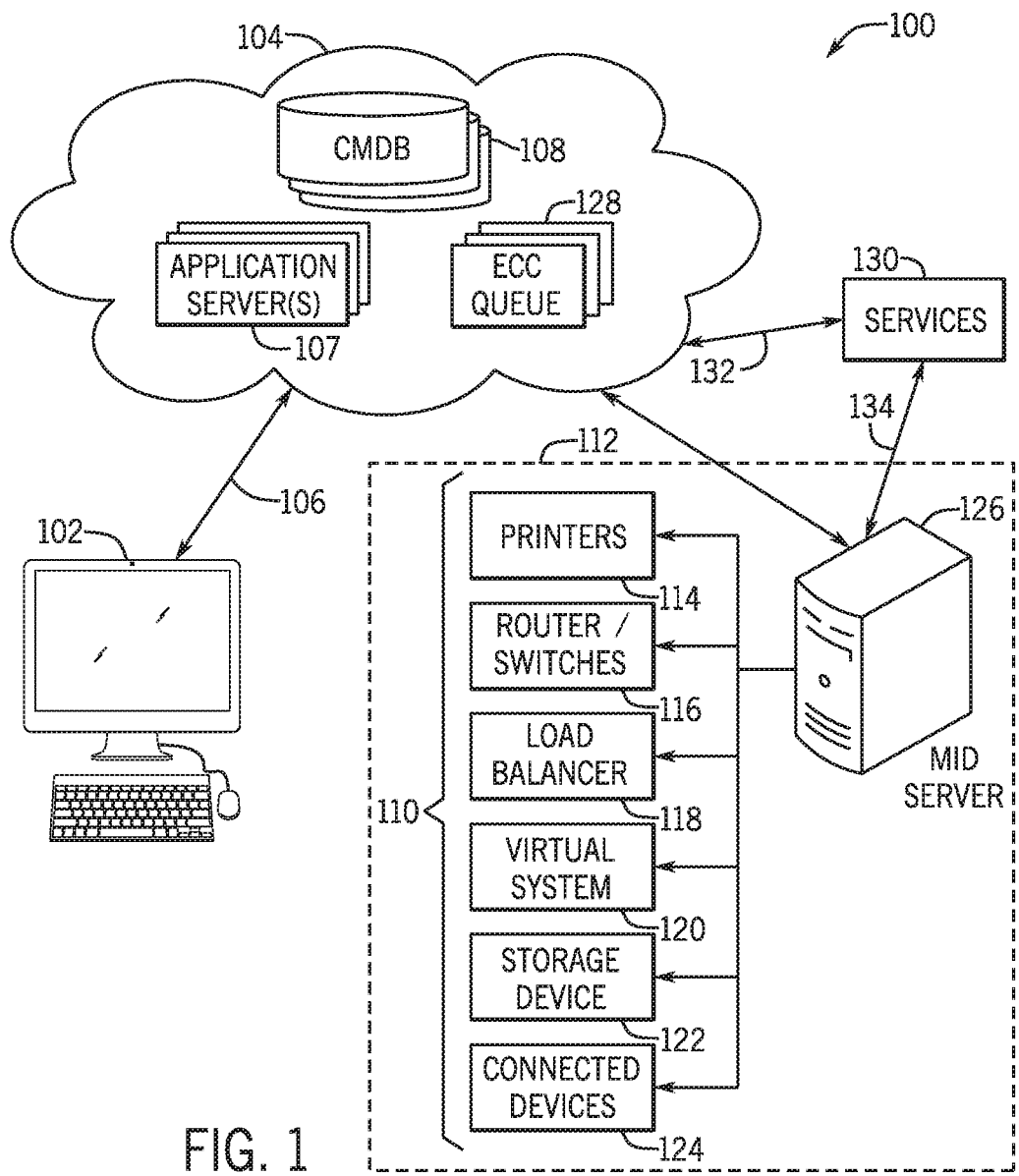
FIG. 1 is a block diagram of a distributed computing system, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and implementation-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Enterprise Services and Information Technology (IT) are increasingly important in this electronics-driven world. As more and more functions are performed by services using some form of distributed computing, the complexity of IT network management can drastically increase. Applications utilize credentials aliases and/or connections aliases (e.g., in strings) to inform them where to connect and/or how to connect to the target devices. For example, the credentials aliases and/or connections aliases may be used in one or more operations, such as orchestration, discovery, security operations, integration content, and/or other business service or management operations.

The services and underlying resources (e.g., application program) may be custom-built by/for a client that utilizes various stages of development. By utilizing the credentials aliases and/or connections aliases, the applications that use them can decouple the connection and credential information from the content. This simplifies sharing content, building content to store relative to and/or in the aliases, and/or simplify movement of the management operations through stages from development environments to testing environments to production environments. Without a centralized connection/credential system, movement through environments may become more complicated due to potential differences in credentials or connections used in different environments that must be changed in the underlying resource (e.g., application program) directly whenever a change is to be made. When the connections/credentials are stored in a centralized system, the underlying resources may utilize variables for connections/credentials that may be resolved from the centralized system. The resolution may be independent of environment for the underlying resource. Alternatively, the resolution may be dependent on environment for the underlying resource. Additionally, the centralized connections/credentials store may be updated separately from the underlying resource. In other words, the connections/credentials to be used by the underlying resource may be updated without making any changes to the underlying resource itself.

FIG. 1 is a block diagram of a system 100 that utilizes distributed computing. As illustrated a client 102 communicates with a platform 104 over a communication channel 106. The platform 104 may include a cloud service that includes distributed computing that occurs separate from the client 102 and/or in multiple locations.

The client 102 may include any suitable computing system. For instance, the client 102 may include one or more computing devices, such as a mobile phone, a tablet computer, a laptop computer, a notebook computer, a desktop computer, or any other suitable computing device or combination of computing devices. The client 102 may include client application programs running on the computing devices. The client 102 may be implemented using a single physical unit or a combination of physical units (e.g., distributed computing) running one or more client application programs. Furthermore, in some embodiments, a single physical unit (e.g., server) may run multiple client application programs simultaneously.

The platform 104 may include any suitable number of computing devices (e.g., computers) in one or more locations that are connected together using one or more networks. For instance, the platform 104 may include various computers acting as servers in datacenters at one or more geographic locations where the computers are connected together using network and/or Internet connections. The communication channel 106 may include any suitable communication mechanism for electronic communication between the client 102 and the platform 104. The communication channel 106 may incorporate local area networks (LANs), wide area networks (WANs), virtual private networks (VPNs), cellular networks (e.g., long term evolution networks), and/or other network types for transferring data between the client 102 and the platform 104. For example, the communication channel 106 may include an Internet connection when the client 102 is not on a local network common with the platform 104. Additionally or alternatively, the communication channel 106 may include network connection sections when the client and the platform 104 are on different networks or entirely using network connections when the client 102 and the platform 104 share a common network. Although only a single client 102 is shown connected to the platform 104, it should be noted that platform 104 may connect to multiple clients (e.g., tens, hundreds, or thousands of clients).

Through the platform 104, the client 102 may connect to various devices with various functionality, such as gateways, routers, load balancers, databases, application servers running application programs on one or more nodes, or other devices that may be accessed via the platform 104. For example, the client 102 may connect to an application server 107 and/or a database 108 via the platform 104. For example, the database 108 may include a configuration management database (CMDB), data (e.g., time-series) storage databases, relational databases, and/or any other suitable database types. The application server 107 may include any computing system, such as a desktop computer, laptop computer, server computer, and/or any other computing device capable of providing functionality from an application program to the client 102. The application server 107 may include one or more application nodes running application programs whose functionality is provided to the client via the platform 104. The application nodes may be implemented using processing threads, virtual machine instantiations, or other computing features of the application server 107. Moreover, the application nodes may store, evaluate, or retrieve data from a database and/or a database server 108.

The database 108 is a series of tables containing information about specific items. For example, in a CMDB, the tables include information about all of the assets and services controlled by a client 102 and the configurations of these assets and services. The assets and services include configuration items (CIs) 110 that may be computers, other devices on a network 112 (or group of networks), software contracts and/or licenses, or services that may be tracked by, used by, and/or accessed by one or more databases of database 108. The CIs 110 include hardware resources, such as server computing devices, client computing devices, processors, memory, storage devices, networking devices, or power supplies; software resources, such as instructions executable by the hardware resources including application software or firmware; virtual resources, such as virtual machines or virtual storage devices; and/or storage constructs such as data files, data directories, or storage models. As such, the CIs 110 may include a combination of physical resources or virtual resources. For example, the illustrated embodiment of the CIs 110 includes printers 114, routers/switches 116, load balancers 118, virtual systems 120, storage devices 122, and/or other connected devices 124. The other connected devices 124 may include clusters of connected computing devices or functions such as data centers, computer rooms, databases, or other suitable devices. Additionally or alternatively, the connected devices 124 may include facility-controlling devices, such as heating, ventilation, and air conditioning (HVAC) units, fuel tanks, power equipment, and/or the like.

As previously mentioned, additional to or in place of the CMDB, the database 108 may include one or more other database servers. The database servers are configured to store, manage, or otherwise provide data for delivering services to the client 102 over the communication channel 106. The database server includes one or more databases (e.g., CMDB) that are accessible by the application server 107, the client 102, and/or other devices external to the databases. The databases may be implemented and/or managed using any suitable implementations, such as a relational database management system (RDBMS), an object database, an extensible markup language (XML) database, a configuration management database (CMDB), a management information base (MIB), one or more flat files, and/or other suitable non-transient storage structures. In some embodiments, more than a single database server may be utilized. Furthermore, in some embodiments, the platform 104 may have access to one or more databases external to the platform 104 entirely.

Access to the CIs 110 from the platform 104 is enabled via a management, instrumentation, and discovery (MID) server 126 via an External Communications Channel (ECC) Queue 128. The MID server 126 may include an application program (e.g., Java application) that runs as a service (e.g., Windows service or UNIX daemon) that facilitates communication and movement of data between the platform 104 and external applications, data sources, and/or services. The MID server 126 may be executed using a computing device (e.g., server or computer) on the network 112 that communicates with the platform 104. As such, in some embodiments, the MID server 126 may connect back to the platform 104 using a virtual private network connection that simulates the CIs 110 being connected to the platform 104 on a common physical network.

In the illustrated embodiment, the MID server 126 is located inside the network 112 thereby alleviating the use of a firewall in communication between the CIs 110 and the MID server 126. However, in some embodiments, a secure tunnel may be generated between a MID server 126 running in the platform 104 that communicates with a border gateway device of the network 112.

The communication queue 128 may be a database table that is typically queried, updated, and inserted into by other systems. Each record in the communication queue 128 is a message from an instance in the platform 104 to a system (e.g., MID server 126) external to the platform 104 that connects to the platform 104 or a specific instance running in the platform 104 or a message to the instance from the external system. The fields of a communication queue 128 record include various data about the external system or the message in the record. For example, the record may include an agent field, a topic field, a name field, a source field, a response to field, a queue field, a state field, a created time field, a processed time field, a sequence number for the message, an error string field, a payload field, and/or other suitable fields for identifying messages and/or the systems sending/receiving the message.

The system 100 may also include utilizing services 130. In some embodiments, the services 130 may include $3^{rd}$-party cloud services that provide functionality external to the platform 104 and/or the network 112 in addition to any services provided directly by the platform 104 via the application server 107. For example, the services 130 may include enterprise services, web services, secure file transfer protocol (SFTP) devices, trivial file transfer protocol (TFTP) devices, and/or other possible functions that may be used in the system 100. Furthermore, the connection to the services may utilize physical or virtual servers. For example, the services 130 may include WINDOWS POWERSHELL and/or Secure Shell (SSH) servers that are physical, virtual, or a combination thereof. The platform 104 may directly connect to the services 130 via a direct connection 132. Additionally or alternatively, the platform 104 may interact with the services 130 via the MID server 126 through a connection 134. For example, the platform 104 may connect through the MID server 126 to a virtual private network (VPN) service (and/or any other previously discussed service/device) in the services 130.

Figure 2:
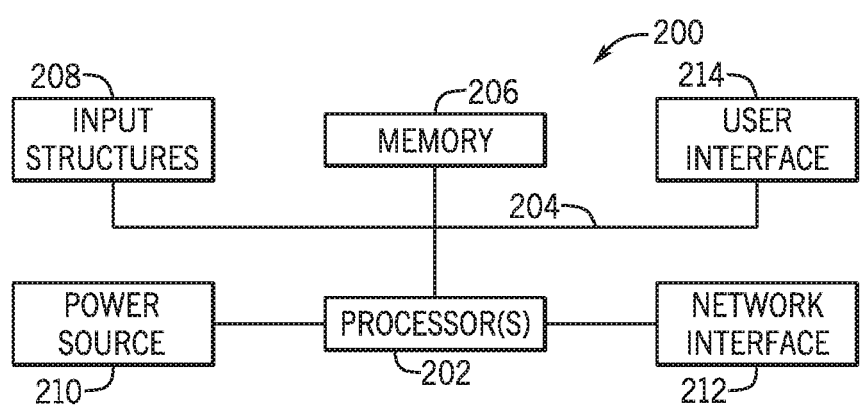
FIG. 2 is a block diagram of a computing device utilized in the distributed computing system of FIG. 1, in accordance with an embodiment.

FIG. 2 generally illustrates a block diagram of an embodiment of an internal configuration of a computing device 200. The computing device 200 may be an embodiment of the client 102, the application server 107, a database 108 (e.g., CMDB), other servers in the platform 104 (e.g., server hosting the ECC queue 128), device running the MID server 126, and/or any of the CIs. As previously noted, these devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components. For example, the device includes one or more processors 202, one or more busses 204, memory 206, input structures 208, a power source 210, a network interface 212, a user interface 214, and/or other computer components useful in performing the functions described herein.

The one or more processors 202 may include processor capable of performing instructions stored in the memory 206. For example, the one or more processors may include microprocessors, system on a chips (SoCs), or any other circuitry performing functions by executing instructions stored in the memory 206 or in another accessible location. Additionally or alternatively, the one or more processors 202 may include application-specific integrated circuits (ASICs), field-programmable gate arrays (FPGAs), and/or other devices that may perform the functions discussed herein without calling instructions from the memory 206. Moreover, the functions of the one or more processors 202 may be distributed across multiple processors in a single physical device or in multiple processors in more than one physical device. The one or more processors 202 may also include specialized processors, such as a graphics processing unit (GPU).

The one or more busses 204 includes suitable electrical channels to provide data and/or power between the various components of the computing device. For example, the one or more busses 204 may include a power bus from the power source 210 to the various components of the computing device. Additionally, in some embodiments, the one or more busses 204 may include a dedicated bus among the one or more processors 202 and/or the memory 206.

The memory 206 may include any tangible, non-transitory, and computer-readable storage media. For example, the memory 206 may include volatile memory, non-volatile memory, or any combination thereof. For instance, the memory 206 may include read-only memory (ROM), randomly accessible memory (RAM), disk drives, solid state drives, external flash memory, or any combination thereof. Although shown as a single block in FIG. 2, the memory 206 can be implemented using multiple physical units in one or more physical locations. The one or more processor 202 accesses data in the memory 206 via the one or more busses 204.

The input structures 208 provide structures to input data and/or commands to the one or more processor 202. For example, the input structures 208 include a positional input device, such as a mouse, touchpad, touchscreen, and/or the like. The input structures 208 may also include a manual input, such as a keyboard and the like. These input structures 208 may be used to input data and/or commands to the one or more processors 202 via the one or more busses 204. The input structures 208 may alternative or additionally include other input devices. For example, the input structures 208 may include sensors or detectors that monitor the computing device 200 or an environment around the computing device 200. For example, a computing device 200 can contain a geospatial device, such as a global positioning system (GPS) location unit. The input structures 208 may also monitor operating conditions (e.g., temperatures) of various components of the computing device 200, such as the one or more processors 202.

The power source 210 can be any suitable source for power of the various components of the computing device 200. For example, the power source 210 may include line power and/or a battery source to provide power to the various components of the computing device 200 via the one or more busses 204.

The network interface 212 is also coupled to the processor 202 via the one or more busses 204. The network interface 212 includes one or more transceivers capable of communicating with other devices over one or more networks (e.g., the communication channel 106). The network interface may provide a wired network interface, such as Ethernet, or a wireless network interface, such an 802.11, Bluetooth, cellular (e.g., LTE), or other wireless connections. Moreover, the computing device 200 may communicate with other devices via the network interface 212 using one or more network protocols, such as Transmission Control Protocol/Internet Protocol (TCP/IP), power line communication (PLC), WiFi, infrared, and/or other suitable protocols.

A user interface 214 may include a display that is configured to display images transferred to it from the one or more processors 202. The display may include a liquid crystal display (LCD), a cathode-ray tube (CRT), a light emitting diode (LED) display, an organic light emitting diode display (OLED), or other suitable display. In addition and/or alternative to the display, the user interface 214 may include other devices for interfacing with a user. For example, the user interface 214 may include lights (e.g., LEDs) and speakers.

Figure 3:
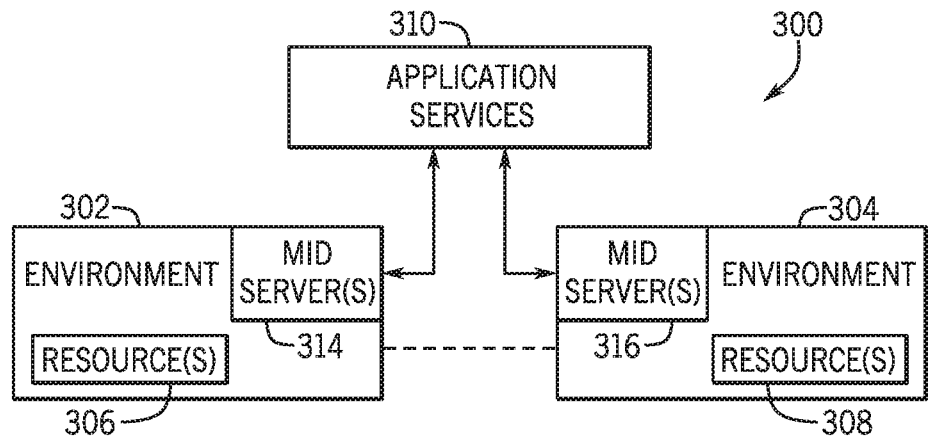
FIG. 3 is a block diagram of an electronic computing and communication system that utilizes the distributed computing system of FIG. 1, in accordance with an embodiment.

FIG. 3 is a block diagram of an embodiment of an electronic computing and communication system 300. The electronic computing and communication system 300 includes one or more environments such as environments 302 and 304 each including resources 306 and 308, respectively. Each environment 302, 304 may include one or more networks coupling resources together in a location-based, function-based, and/or common credentials-based grouping. For example, the environments 302, 304 may include different development stages, instances between clients, and/or different customer service environments used to represent customer service infrastructure in a technical support, sales, billing, and/or other groupings.

For example, the environments 302, 304 may include a datacenter and all devices coupled to one or more networks located at the datacenter. Additionally or alternatively, the environment 302, 304 may be distributed across multiple geographical locations. Thus, the environment 302, 304 may include any devices that are accessible by a user account and/or role including resources that may be spatially distant from each other. In some embodiments, resources 306, 308 of the environments 302, 304 may communicate with each other across environments. However, in some embodiments, aspects of various environments may be provided by different vendors without communication therebetween. In such embodiments, the resources of disparate environments may communicate with application services 310 in the platform 104 and/or the services 130 application services 310. The resources 312 and 314 may applications that are running in respective environments 302 and 304.

The application services 310 may include one or more servers providing functionality as previously discussed in relation to the services 130. Additionally or alternatively, the application services 310 may provide services from within the platform 104 (e.g., application servers 107). In some embodiments, these actions may be initiated using the client 102, scheduled for periodic occasions, or a combination thereof. For example, a client 102 may receive a request, via its input structures, to query an identity of an application program interface (API) used by a resource to access a particular vendor/provider for the environment 302 that is passed to the application services 310 to query the database 108. As another example, the client 102 may receive a request, via its input structures, to query an identity of a user authorized to access a particular resource that is passed to the application services 310.

In the illustrated embodiment, each environment 302 and 304 has its own one or more MID servers 314 and 316. In some embodiments, a single set of MID servers 314, 316 may be employed when the MID servers may reach into multiple environments. For example, if the MID server is run in the platform 104 (e.g., in the application services 310), a single MID server may be used to manage both environments 302 and 304. Additionally or alternatively, if the MID servers 314 has access to the environment 304, the MID servers 316 may be omitted.

Users may utilize connections and credentials within an application services 310 that is consistent between all access points globally and/or as environment-specific connections credentials. Connections include target host/IP required by outbound integration mechanisms along with credentials being used. The credentials include any authentication mechanisms and/or security keys for external systems access via the application services 310. These credentials and connections may be associated using aliases. Using these aliases a user may configure environment-specific connection and credential entries for appropriate environments/instances. In other words, a user (e.g., via the client 102) may select credentials based on a given tenant environment/domain based on capabilities available to the MID server. These capabilities may be customer defined by service and/or technical capability to enhance selection of an appropriate MID server, as discussed below. For example, the capabilities may include capabilities due to an operating system of the MID server, SAP/azure capabilities, whether a host or IP address falls in a range of addresses, and/or other capabilities.

Furthermore, the use of connection and/or credential aliases may enable using a centralized credential and connection system that enables decoupling of credential and/or connection information from an application program. Instead, application programs may utilize these connection aliases and/or credential aliases as application variables that may be resolved before and/or at runtime of the application program.

This decoupling simplifies sharing content since content of the application may be shared without sharing the content of the aliases. Indeed, the content of the aliases may be suppressed from a target to which the content is shared and/or the content of the aliases may be resolved by the target from the centralized credential and connection system used to resolve aliases for the sharing source. Decoupling the aliases from the application enables a store of connections/credentials to be populated.

Furthermore, these stores may be environment-specific. For example, in some embodiments, a development environment may utilize a connection or credential instance that is resolved by the connection and/or credential aliases, while testing and production environments may utilize different target services by making a different connection or credential active that alias to resolve. Additionally or alternatively, in some embodiments.

By ensuring that the tables are populated properly, movement of an application program between development, testing, and production environments may be simpler to perform than if the credentials and/or connections are embedded into the application program and edited in the application program for movement between environments.

Figure 4:
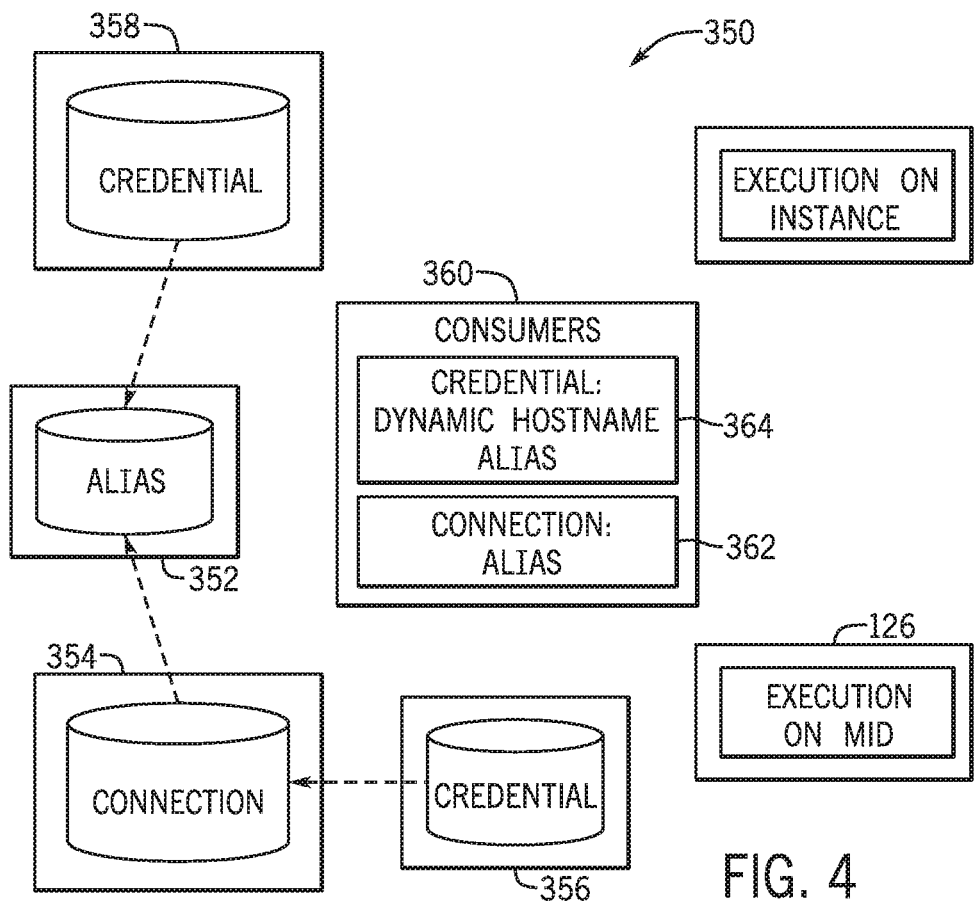
FIG. 4 is a schematic diagram illustrating an alias creation process, in accordance with an embodiment.

FIG. 4 illustrates a schematic diagram of a process 350. A consumer (e.g., via the client 102) creates and/or accesses an alias in an alias table 352. The consumer may be any process/application program that may "consume" or use the information to perform (automated) operations. For example, the consumer may include services that run orchestration, discovery, service mapping, importing, exporting, cloud management, and/or other similar data management disciplines. Orchestration may include automation of simple or complex tasks that may be performed on remote servers that may or may not be performed manually. Moreover, orchestration may include multi-system tasks and include one or more other management disciplines included previously noted. Orchestration may also interact with any suitable type of infrastructure, such as applications, databases, and/or hardware. For instance, orchestration may include mail servers, file servers, secure shell (SSH) activities, directory activities, cloud activities, and/or other management related activities.

Discovery may be used to discover information about the CIs 110. Service mapping collects data about CIs 110 (e.g., via discovery), generates a map of CIs 110 and their connections, and stores the map in the CMDB. Some of the consumers may utilize a persistent connection (e.g., static address) while others may utilize a dynamic connection (e.g., dynamic address at runtime, mapping that may change, etc.). Furthermore, the consumers may use one or more sets of known credentials regardless of whether the connection is persistent or dynamic. For example, orchestration may utilize persistent connections, dynamic connections, or a combination of persistent and dynamic connections concurrently. Discovery may utilize a dynamic connection with a list of associated credentials used in the discovery. Service mapping similarly may utilize a dynamic connection and known credentials by CI 110 and/or types of CIs 110. Importing, exporting, and/or cloud management may use persistent connections with known credentials. Furthermore, cloud management may bind a single account (e.g., administrator account) to multiple known credentials.

Returning to FIG. 4, if the alias in the alias table 352 is a connection type corresponding to a connection entry with a known address/location a connection table 354 accessed using the alias. In some embodiments, the connection entry in the connection table 354 may correspond to an associated credential entry in a credential table 356.

If the address/location is dynamic, the connection entries in the connection table 354 may be unassociated with the alias. Instead, the aliases designated as a credential-type alias and associated with a credential entry in a credential table 358 directly from the alias. In some embodiments, the credential table 356 and 358 may correspond to a common table. In other words, in these embodiments, the credentials table 356 and credential table 358 may at least partially include the same credentials. For example, the credential table 356 and the credential table 358 may share at least one username and password while the credentials table 356 and/or the credentials table 358 may include some credentials that are not included in the other set of credentials. In some embodiments, the credential table 356 and/or the credential table 358 may include only one set (e.g., username and password) of credentials each.

When a consumer 360 is to use connections, the consumer 360 may specify a connection alias 362 by specifying an alias that has been associated with an entry in a connection table 354. Additionally, or alternatively, when a hostname or location is dynamically populated at runtime, the consumer 360 may instead utilize a credential alias 364 by specifying an alias that has been associated with a credential.

As discussed below, during execution, the alias may be used by an instance on the application server 107 and/or the MID server 126 to connect to and/or authenticate with a target location as identified in the alias. In some embodiments, as discussed below, use of the MID server 126 may be optionally enabled. Moreover, in some embodiments, an automated selection of an appropriate MID server 126 in a multi-MID server system may be enabled to use a list of criteria.

As illustrated in FIG. 4, the consumer 360 may identify a connection alias 362 and/or a credential alias 364. In some embodiments, when a connection alias 362 identifies a connection entry in the connection table 354, the entry may further flag a credential that may be used. However, in some embodiments, the connections and the credentials to be used may be specified separately using the credential alias 364 and connection alias 362. Regardless, the credentials and connections are stored in different locations. These different locations enable flexibility of use (e.g., backwards compatibility) with some systems that may include a single database for credentials without requiring data migration to move contents of the pre-existing credentials database. Furthermore, by bifurcating the credentials and connections tables, access to one table may be granted without giving access to another. For example, a consumer may access the connection table with a first level of authorization for less secured/unsecured connections without being able to access the credentials that uses a second level of authorization. Furthermore, by keeping a separate credentials table and connections table, connections that do not use a credential may not increase congestion of the credentials table. Similarly, when a credential is used without a connection alias (e.g., using a dynamic connection), the credentials table may be accessed without congesting the connections table.

Figure 5:
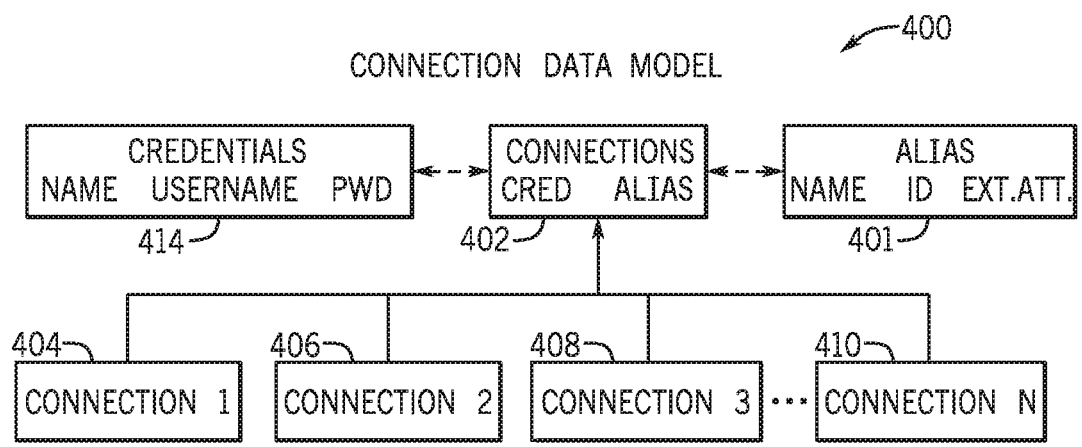
FIG. 5 illustrates a data model for connection an alias used in the alias creation process of FIG. 4, in accordance with an embodiment.

FIG. 5 illustrates a data model 400 of connection aliasing. The data model 400 includes an alias 401 as an entry in the alias table 352. The alias 401 includes a name, a type identifier (ID), and/or extended attributes. The name may be used to cross-references the alias table 352 with the connection table 354, the credential table 356, and/or the credential table 358. The ID or a separate type field may identify a type (e.g., connection or credential) for the alias 401.

For example, the name field may provide a name for the alias 401, and the identifier may include a calculated field that is derived from the name field and another field. For example, the identifier may be the value in the name field combined with a scope name field. The scope name field may indicate the extent (e.g., type) to which the alias is to be used. For example, the scope name may include a global indicator in the scope name field to indicate that the alias may be used for any consumer types, application types, users, or any other purposes. Alternatively, the scope name may be limited to a specific use, such as to specific consumer types, users, application types, and the like. In some embodiments, each identifier is unique to each credential alias. In other words, an identifier for a specific scope may only have one corresponding alias with the same name.

The extended attributes may include integration-specific fields. In other words, these attributes may be set differently for different environments. For example, an alias may include extended attributes of a duration before timing out, a size of a page, and/or other attributes that may vary from environment to environment.

The alias 401 references connection aliases in the connections table 402 thereby coupling consumers 360 to connection information indicated in the alias 401. As previously noted, each alias 401 identifies a connection and/or a credential for the connection.

The connections table 402 that includes information for connections 404, 406, 408, and 410. The connections 404, 406, 408, and 410 may include one or more end points, uniform resource locators (URLs), and/or other data about a location of a target to be connected to. The connections 404, 406, 408, and 410, as entries in the connections table 402, inform consumers 360 how to connect to an end device by providing a hostname, an address, a port, a URL, and/or other information instructing how to connect to a target device.

In some embodiments, the connections table 402 supports domain separation separating data into logically-defined domains to enable: data segregation between entities (e.g., using different connections and/or credentials tables between environments), customization of process definitions and user interfaces for each domain, and/or maintaining some global processes and reporting in a single instance.

Figure 6:
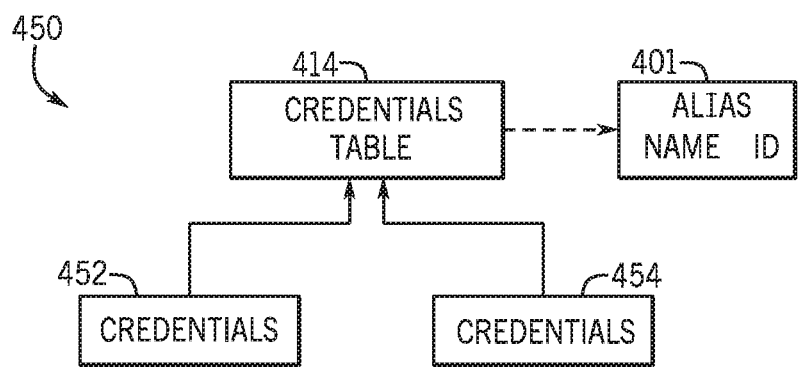
FIG. 6 illustrates a data model for credential an alias used in the alias creation process of FIG. 4, in accordance with an embodiment.

When the alias 401 includes an ID or a type field that indicates that the alias 401 is a credential-type, the alias 401 may be used to access credentials directly from a credential table independently from a connection table. FIG. 6 illustrates a data model 450 for a credential-type alias. A credentials table 414 includes credentials 452 and 454. The credentials 452 and 454 may include OAuth, Web Token, API Keys, Common Information Mode (CIM) credentials, Simple Network Management Protocol (SNMP) credentials, SSH credentials, SSH private key credentials, operating system (OS) credentials, cloud service credentials, other device credentials, or any combination thereof. The credentials 452 and 454 may include authentication information (e.g., username, account number, etc.) and/or an associated password or key used to authenticate connection using the identifiers.

Figure 7:
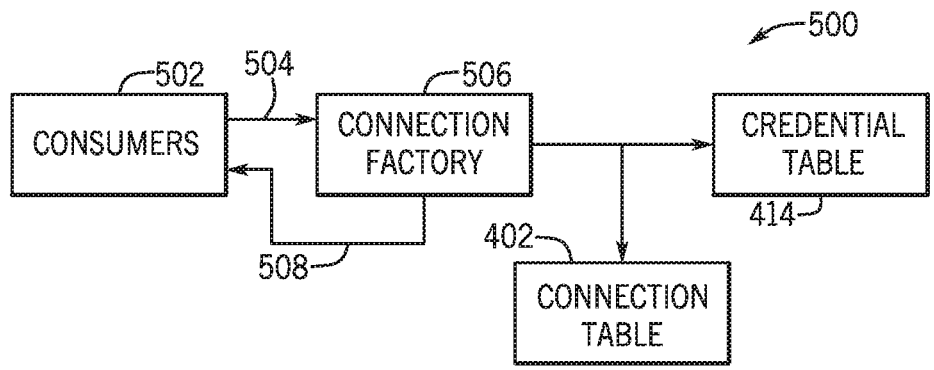
FIG. 7 illustrates a process for consuming aliases of a connection type, in accordance with an embodiment.

FIG. 7 illustrates a process 500 for consuming aliases of the connection type. When a consumer 502 has a persistent connection/known target (e.g., hostname, address, URL, etc.) to connect to, the consumer 502 sends a request 504 to a connection factory 506 implemented in the platform 104. The connection factory 506 may include a processor is coupled to the connections table 402. In some embodiments, the processor may also be coupled to the credentials table 414. The request 504 includes the alias 401 having an identifier that identifies the alias as having a connection type. The connection factory 506 pulls the associated connection information and credential information from the connections table 402 and the credentials table 414, respectively. In some embodiments, the connection factory 506 pulls the connection information from the connections table 402 then derives a proper credential from the credentials table 414 using the alias and/or the connection information. The connection factory 506 then returns a connection and credential object 508 including the connection and credential information.

Figure 8:
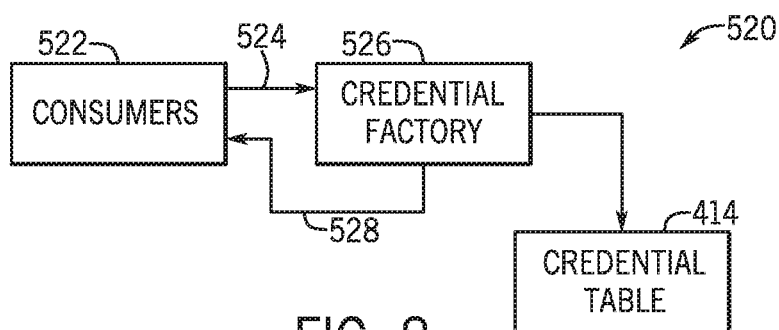
FIG. 8 illustrates a process for consuming aliases of a credential type, in accordance with an embodiment.

FIG. 8 illustrates a process 520 for consuming aliases of the credential type. When a consumer 522 has a dynamic connection (e.g., address/hostname determined at runtime), the consumer 522 sends a request 524 to a credential factory 526 implemented in the platform 104. The connection factory 506 may include a processor is coupled to the credentials table 414. The request 524 includes the alias 401 with an identifier that indicates that the alias 401 is of the credential type. The credential factory 526 pulls the associated credential information from the credentials table 414. The credential factory 526 then returns a connection object 528.

Figure 9:
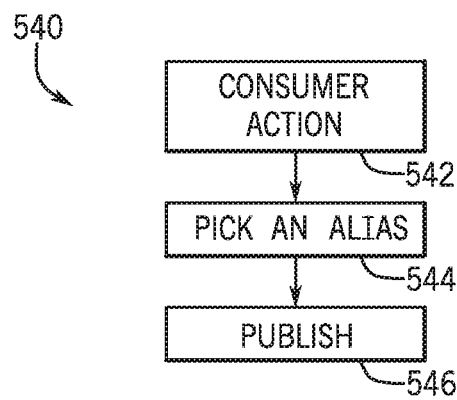
FIG. 9 illustrates a process for consuming aliases of a suitable type, in accordance with an embodiment.

FIG. 9 illustrates a process 540 for consuming aliases. The consumer (e.g., consumer 502 and/or 522) attempts to perform an action (block 542). This action utilizes a connection. Thus, the consumer picks an appropriate connection alias (block 544). Choosing the appropriate alias includes choosing a credential type or a connection type for the alias. For example, when the consumer has a preconfigured endpoint (e.g., persistent connection), the consumer may choose a connection type alias. Additionally or alternatively, when the consumer receives a hostname/endpoint dynamically at runtime, the consumer may choose a credential type alias. The consumer then publishes to or requests the alias from the connection factory 506 and/or the credential factory 526 (block 546). The connection factory 506 and/or the credential factory 526 may be implemented on the platform 104 (e.g., the application server 107) and/or on the MID server 126. In some embodiments, the connection factory 506 and the credential factory 526 may be embodied in a common component (e.g., hardware or software) that performs functions of both the connection factory 506 and the credential factory 526.

Figures 10, 11:
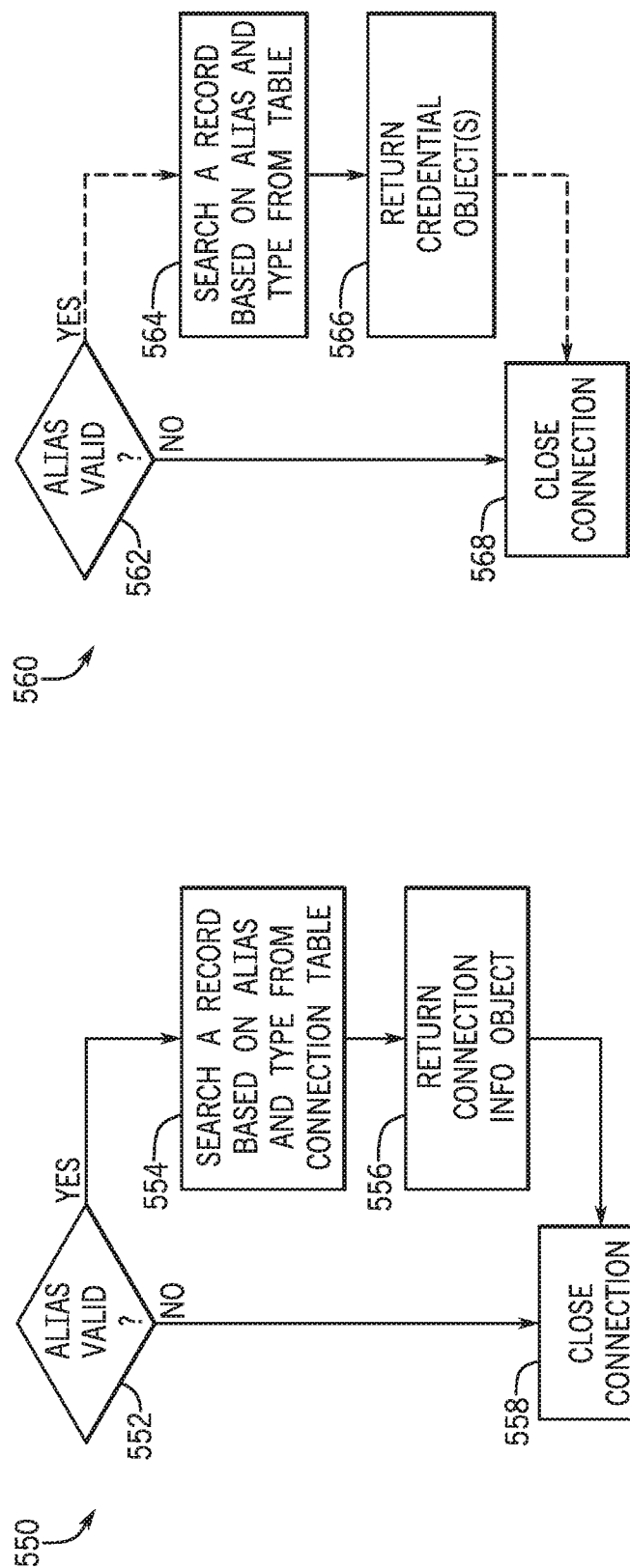
FIG. 10 illustrates a process reflecting a response of a connection factory to a connection alias transmitted from the consumer, in accordance with an embodiment.
FIG. 11 illustrates a process reflecting a response of a credential factory to a credential alias transmitted from the consumer, in accordance with an embodiment.

FIG. 10 illustrates a process 550 reflecting a response of the connection factory 506 to a connection alias transmitted from the consumer. The connection factory 506 determines whether the alias is valid (block 552). For example, the connection factory 506 determines whether the requested/published alias is formatted properly. Additionally or alternatively, such determination may be made after searching the connections table 402 to determine whether a valid record exist in the connections table 402 as an indicator of whether the alias is valid. If the alias is valid, the connection factory 506 searches for one or more records based on the alias and the type (e.g., connection) of the alias from the connections table 402 (block 554). Upon discovery of the record(s), the connection factory 506 returns connection information associated with the alias to the consumer (block 556). This connection information may include information for connection to one or more hostnames/endpoints. The connection information may also include associated credentials for at least some of the hostnames/endpoints included in the connection information. After finding the record and/or designating the request as invalid, the connection factory 506 may close the connection to the consumer (block 558).

FIG. 11 illustrates a process 560 reflecting a response of the credential factory 526 to a credential alias transmitted from the consumer. The credential factory 526 determines whether the alias is valid (block 562). For example, the credential factory 526 determines whether the requested/published alias is formatted properly. Additionally or alternatively, such determination may be made after searching the credential table 422 to determine whether a valid record exist in the credential table 422 as an indicator of whether the alias is valid. If the alias is valid, the credential factory 526 searches for one or more records based on the alias and the type (e.g., credential) of the alias from the credential table 422 (block 564). Upon discovery of the record(s), the credential factory 526 returns credential info associated with the alias to the consumer (block 566). The connection information includes one or more credentials that are to be used by the consumer to connect to hostnames/endpoints even if the hostname/endpoint is determined at runtime. After finding the record and/or designating the request as invalid, the credential factory 526 may close the connection to the consumer (block 568).

Figure 12:
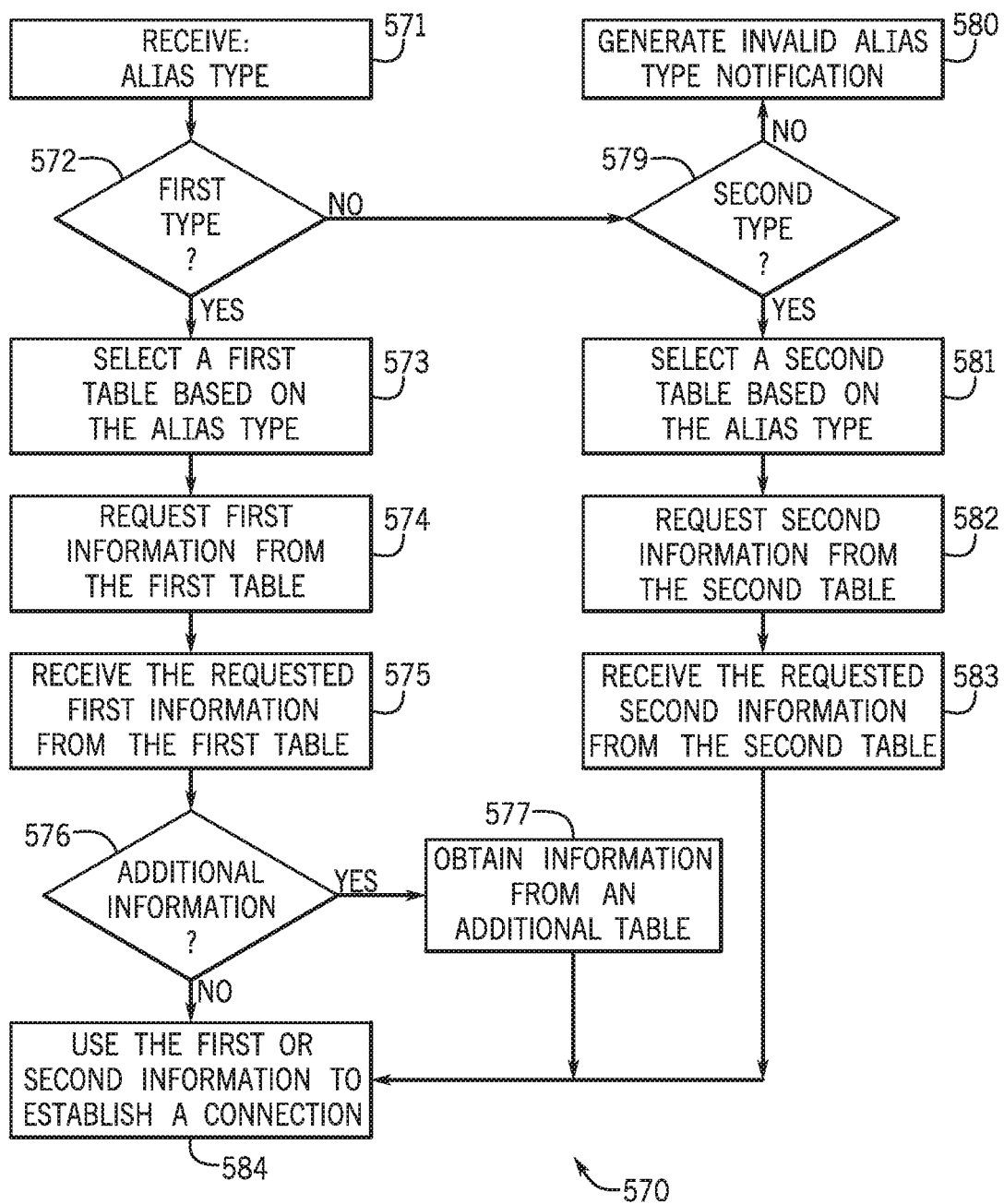
FIG. 12 illustrates a process for establishing an connection based on alias type, in accordance with an embodiment.

FIG. 12 illustrates a process 570 for establishing a connection based at least in part on an alias type. An alias type is received by a processor(s) (block 571). As previously noted, the received alias may include a request to complete a function that utilizes a type of information to be retrieved using the alias (e.g., indicated in the ID and/or type field). For example, if a known address is provided, the alias type may have an indicator that the alias is a connection-type alias that may have a corresponding entry in a connection table. The processor(s) then determines whether the received alias type corresponds to a first type (block 572). For example, the first type may be a connection-type.

If the alias type corresponds to the first type, the processor(s) selects a first table based on the alias type (block 573). For example, if the alias type is a connection type, the connections table 402 may be used. The processor(s) then requests first information from the first table (block 574). For example, the first information (e.g., connection information) may correspond to a type of table for the first table. The processor(s) then receive the first information from the first table (block 575). The processor(s) then determine whether additional information beyond the first information is to be used (block 576). For example, the additional information may include credential information to be used alongside with connection information in the first information. If additional information is to be included, the processor(s) obtain the additional information from an additional table (block 577). For example, the additional table may be the credentials table 356.

If the alias type does not correspond to the first type, the processor(s) determine whether the alias type corresponds to a second type (block 579). If the alias type does not correspond to the first or second type, the processor(s) generate an invalid alias type notification (block 580). Upon generation of an invalid alias type notification, the process 570 may end without obtaining information indicated in the alias.

If the alias type corresponds to the second type, the processor(s) select a second table based on the alias type (block 581). For example, if the alias type is a credential type, the credentials table 414 may be used. The processor(s) then requests second information from the second table (block 582). For example, the second information (e.g., credential information) may correspond to a type of table for the second table. The processor(s) then receive the second information from the second table (block 583). Once the first or second information is received, the processor(s) use the first or second information to establish a connection (block 584).

In some embodiments, the second table and the additional table may be the same table. Furthermore, although the illustrated embodiment indicates that the first and second alias types are mutually exclusive, in some embodiments, an alias type may be the first alias type, the second alias type, or a combination of both alias types. In other words, in such embodiments, the processor(s) may determine that the alias type is both the first and second types in the evaluation blocks 572 and 579. Furthermore, in some of these embodiments, the determination of additional information may be omitted such that the additional information is retrieved using the second data type following evaluation block 579. Additionally, although the process 570 includes only two data alias types with correspond two tables, in some embodiments the process 570 may utilize three or more tables with information to be retrieved. For example, the third table may include a list of aliases and related referencing indices or may include information other than that included in the first or second tables. For example, the tables may be divided into appropriate domain access, authorization levels, or other parameters that may also guide which table to use for obtaining information by alias type.

Figure 13:
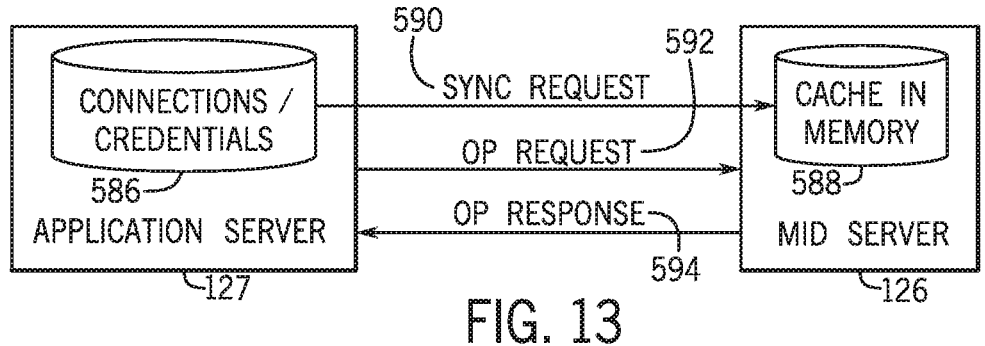
FIG. 13 illustrates data caching between a discovery server and an application service, in accordance with an embodiment.

As previously noted, aliases may be used to access connection/credential information from the application server 107 and/or the MID server 126. As illustrated in FIG. 13, in some embodiments, the data may be accessed via the MID server 126 because connection/credential information may be cached on the MID server 126 from the application server 107 and/or other locations used in the platform 104. The application server 107 (or the database 108) may store the connection/credentials information in one or more databases 586 (e.g., connections table 402 and credential table 422) that the MID server 126 caches in local memory 588. Such caching may occur by a push from the one or more databases 586 to the local memory 588 of the MID server 126. Alternatively, the MID server 126 may request a synchronization request 590 from the one or more databases 586. During operation, the application server 107 sends operation requests 592 to the MID server 126, and the MID server 126 responds with operation responses 594 to the application server 107.

Figure 14:
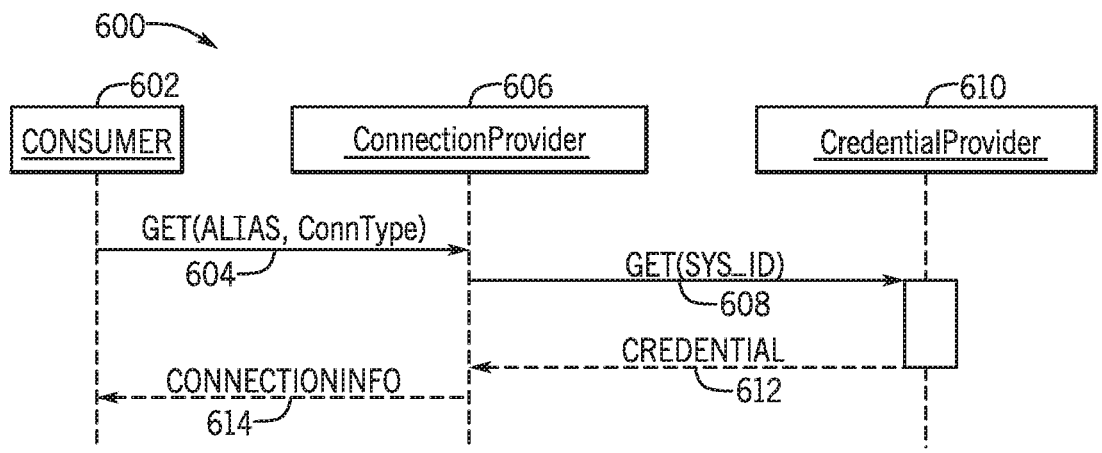
FIG. 14 illustrates a call flow that may be used when a persistent host is used, in accordance with an embodiment.

FIG. 14 illustrates a call flow 600 that may be used when a persistent host is used. For example, the call flow may be utilized in an orchestration process with a persistent host, a cloud management process, and/or other suitable processes where the target host is persistent. A consumer 602 performs the process (e.g., orchestration, cloud management, etc.) calling for a connection. In response, the consumer 602 sends an alias request 604 to a connection provider 606. The connection provider 606 may be the connections table 402 or any other mechanism for returning connection information in response to the alias request 604. The connection provider 606 then sends a credential request 608 to a credential provider 610. The credential provider 610 may include the credential table 422 and/or any mechanism for returning credentials 612 in response to the credential request 608. In some embodiments, the connection provider 606 may include an extension to the connections table 402 to include the credentials 612. In such embodiments, the connection provider 606 may provide the credentials 612 without requesting information from the credential provider 610. Regardless of whether the connection provider 606 or the credential provider 610 provide the credentials 612. The connection provider 606 provides connection information 614 back to the consumer 602. The connection information 614 includes the credentials 612 for establishing a connection using the connection information 614.

Figure 15:
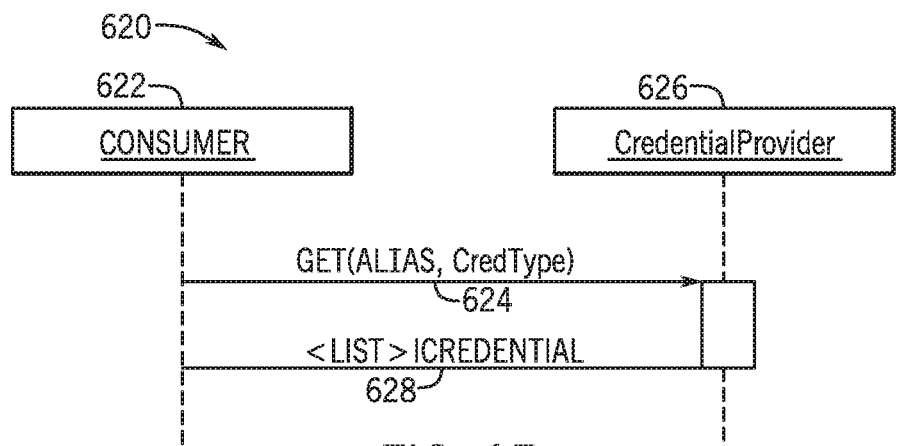
FIG. 15 illustrates a call flow for use when the runtime host is dynamically determined at runtime, in accordance with an embodiment.

FIG. 15 illustrates a call flow 620 for use when the runtime host is dynamically determined at runtime. A consumer 622 performs an action that is to use credentials. For example, the action may include discovery, service mapping, and/or other actions that utilize credentials. The consumer 622 then sends a credential request 624 to a credential provider 626 (e.g., connections table 402) that includes an alias. During discovery, the alias may be a null alias. During service mapping, the alias may be the table name of the CI 110 in the CMDB. In response to the credential request 624, the credential provider 626 provides credentials 628 to the consumer 622 to be used in the action.

Figure 16:
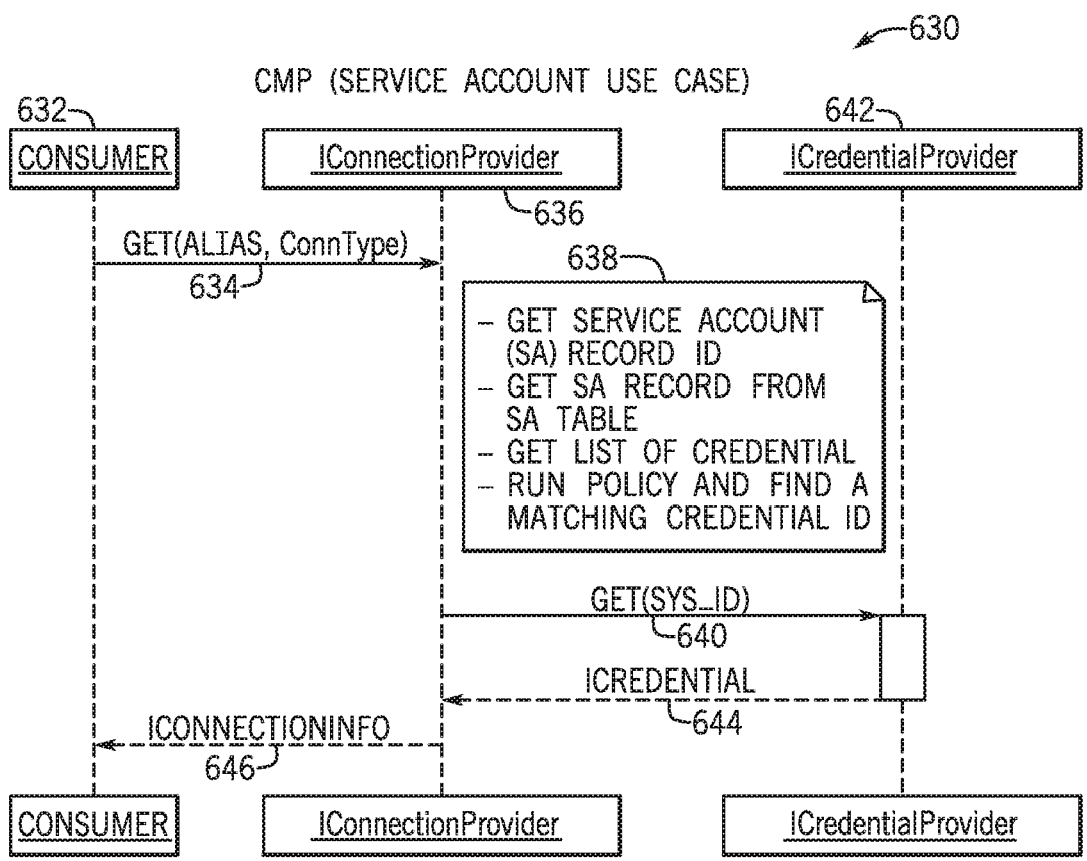
FIG. 16 illustrates a call flow for use when cloud management functions utilize a service account, in accordance with an embodiment

FIG. 16 illustrates a call flow 630 for use when cloud management functions utilize a service account. A service account may be used to use APIs for monitoring/reporting functions. During cloud management, a consumer 632 (e.g., process/processor performing the cloud management) sends a request 634 to a connection provider (e.g. connections table 402) for connection information using a connection alias. In response to the request 634, the connection provider 636 and/or a related processor selecting a suitable credential identifier (block 638). Selecting a suitable credential identifier includes obtaining a service account (SA) record identifier, getting a SA record from an SA table, get a list of credentials based on the SA record, and use policy to determine a matching credential identifier as the suitable credential identifier. After selecting a suitable credential identifier, the connection provider 636 requests 640 the credential from a credential provider 642 (e.g., credential table 422). The credential provider 642 responds with credential information 644 to the connection provider 636. The connection provider 636 then sends connection information 646 back to the consumer 632. The connection information 646 includes the credential information 644 from the credential provider 642.

Figure 17:
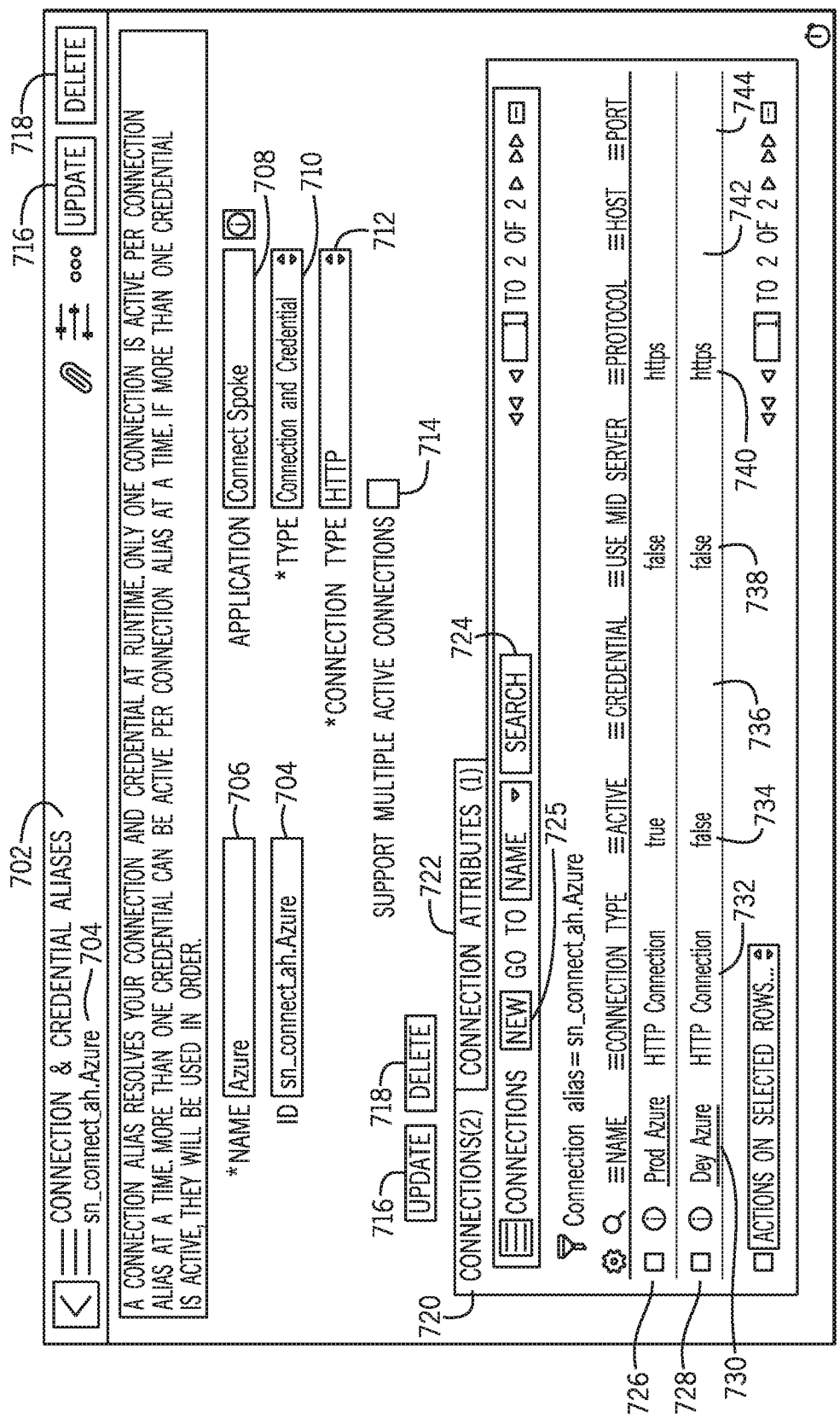
FIG. 17 illustrates an interface that may be used to create/edit connection entries, in accordance with an embodiment.

FIGS. 17-20 illustrate a credential and connection interface 700 that may be used to generate/edit aliases. FIG. 17 illustrates the credential and connection interface 700 in a connection and credential page. In other words, the page may be used to create/edit connection entries. Furthermore, the connection and credential page may be used to add, change, and/or remove credential relationships in the connection entries. In some embodiments, credential aliases may be generated using the credential and connection interface 700 by leaving connection information blank. Additionally or alternatively, credential aliases may be generated without connection information in a separate page.

The credential and connection interface 700 includes a unique identifier 704 for the alias and a name 706 for the alias. The alias may also include an application field 708 to identify which application(s) may use/call the alias. Moreover, the alias may include a type field 710 that is used to indicate a type for the alias. For example, the type field 710 may be used to indicate that the alias is a connection type, a credential type, or a connection-and-credential type. When the alias is a connection alias, the credential and connection interface 700 may be used to indicate a connection type for the connection. In some embodiments, only a single connection may be active for an alias unless a support multiple active connections button 714 is checked. Any changes in the credential and connection interface 700 may be saved via an update button 716 and/or the alias or changes to the alias may be deleted/discarded via a delete button 718.

The credential and connection interface 700 may also be used to view all connection entries corresponding to the alias in a connections tab 720. Furthermore, the credential and connection interface 700 may be used to view connection attributes associated with the alias via a connection attributes tab 722. As previously described, these attributes may differ between connections (e.g., connection aliases). In either tab 720 or 722, the corresponding displayed entries may be searched using a search field 724. New entries may be created with a new button 725. In the connections tab 720, connections 726 and 728 are displayed for connections. For example, the connection 726 may correspond to a connection to azure for a production phase, and the connection 728 may correspond to a connection to azure for development phase.

The credential and connection interface 700 may display information about the connections arranged in columns. For example, the columns may include a name column 730 for each connection. A connection type column 732 indicates a connection type for the connections. An active column 734 indicates whether the connection is active. A credential column 736 indicates a credential (e.g., credential alias) used for the connection. The credential may include an identifier for locating the credential in a credential table. A use MID server column 738 may be used to indicate whether the connection occurs through a MID server. A protocol column 740 indicates a protocol for the connections. A host column 742 indicates a host for the connections. A port column 744 indicates a port used for the connections.

Figure 18:
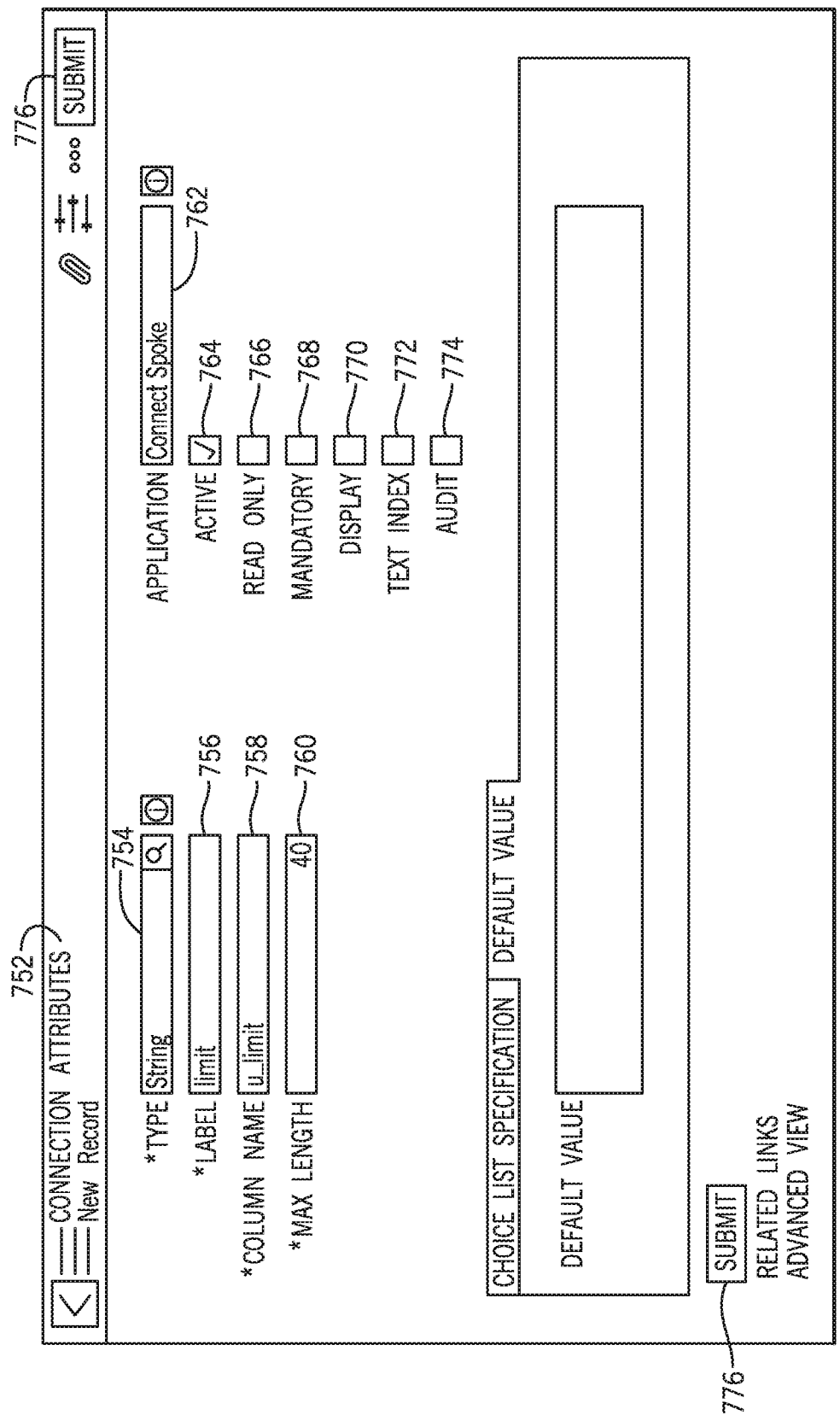
FIG. 18 illustrates a connection attributes page of the interface of FIG. 17 that may be used to add/edit attributes of a connection, in accordance with an embodiment.

The credential and connection interface 700 may open a page 750 for connection attributes as illustrated in FIG. 18. The page 750 includes a title 752 indicating that a connection attribute record is being created. The page 750 includes a type field 754 for the attribute indicating a type of the attribute, such as a format of the attribute to be interpreted for the connection. The page 750 includes a label field 756 for naming the attribute. A column field 758 may be used to set a name to be displayed in the credential and connection interface 700 in the columns of the credential and connection interface 700. A max length field 40 may be used to indicate a length and/or size of the attribute. An application field 762 may identify an application that may use/call the attribute. An active radio button 764 may be used to indicate whether the attribute is active. A read only radio button 766 may be used to set whether the attribute is read only. A mandatory radio button 768 may be used to indicate whether the attribute is mandatory for a connection or may be optional. A display radio button 770 may be used to set whether the attribute is displayed in a connection page for viewing details about the connection. A text index radio button 772 may be used to set whether the text is indexed for searching. An audit radio button 774 may be used to set whether the attribute should be audited in a subsequent audit. Any changes to the page 750 may be saved to the attribute using a submit button 776.

Figure 19:
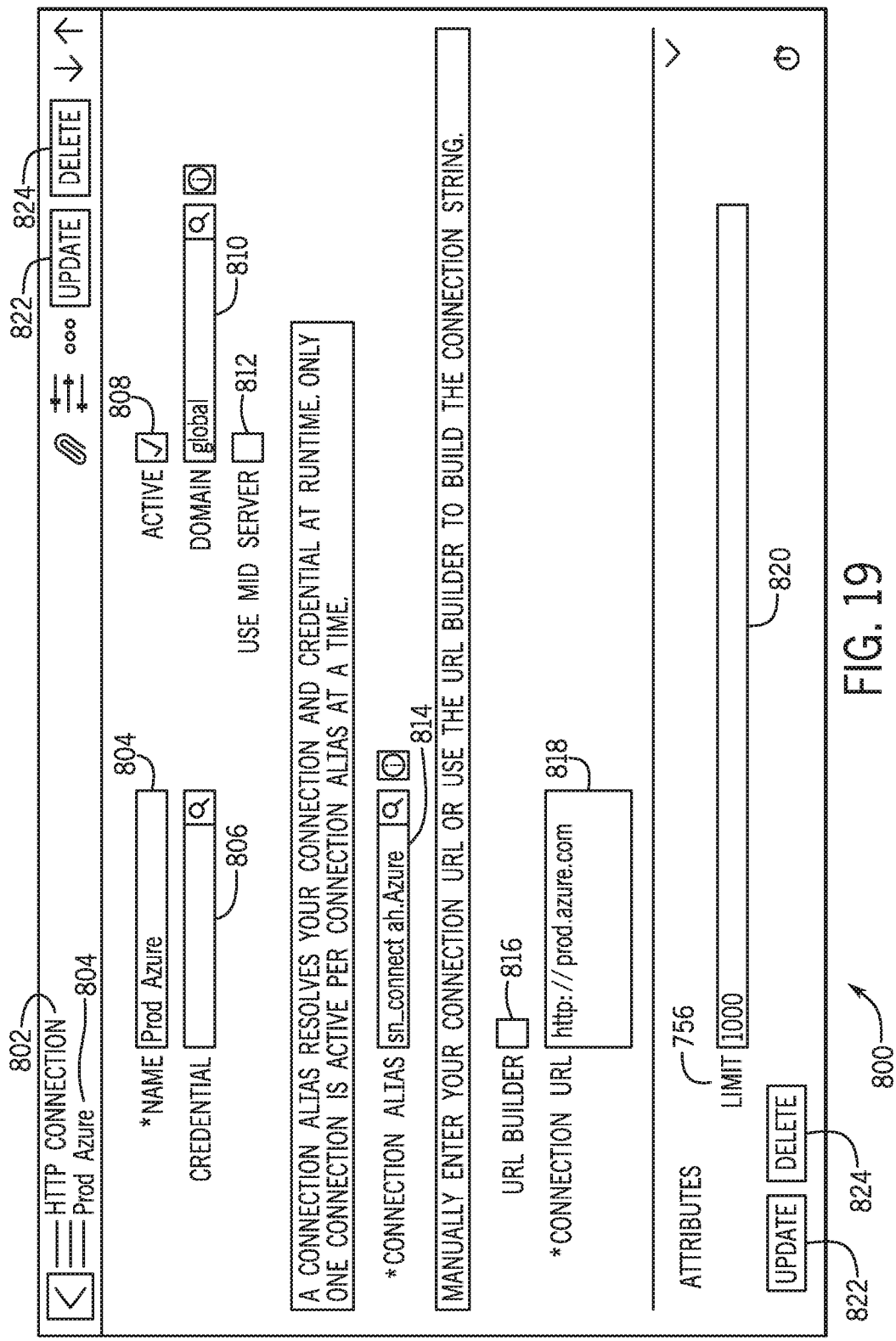
FIG. 19 illustrates a connection editing page of the interface of FIG. 17 that may be used to edit connection information for a connection selected via the interface of FIG. 17, in accordance with an embodiment.

FIG. 19 illustrates a page 800 for connection editing. The page 800 includes a title 802 indicating that the page is for an HTTP connection. The page 800 also identifies the connection by a connection name 804. The page 800 also includes a credential field 806 for indicating a credential to be used in the connection. As previously noted, the credential field 806 may include an identifier for identifying the credential in a credential table. The page 800 also includes an active radio button 808 indicating whether the connection is active. The page 800 also includes a domain field 810 that may be used for domain separation or for indicating that the connection is available globally. The page 800 also may include a MID server radio button 812 that may be used to indicate whether the connection is to occur through the MID server 126. In some embodiments, selection of the MID server radio button 812 may cause a menu to be invoked that enables a user to select criteria for selection which MID server 126 is used in a multi-MID server system. For example, the criteria may include selecting a MID server that is online or waiting for one that is offline to come online. Additionally or alternatively, the criteria may include selecting a MID server based on certain capabilities of the MID server. For example, the capabilities may include an operating system of the MID server. Additionally or alternatively, in some embodiments, only some MID servers may be able to reach a target destination (an IP address) for the connection. In such embodiments, the capabilities may include an IP range for which the appropriate MID servers would be capable of reaching. The criteria may include any other information that may be helpful in determining which MID server to use, such as MID server load, physical location of the MID servers, and/or other suitable criteria.

The page 800 includes a connection alias field 814 that identifies the connection alias for the connection. The page 800 includes a URL builder radio button 816 that that may be used to indicate that a URL in connection URL field 818 is to be expanded using known values and/or resolving variables. The connection URL field 818 indicates the URL to be used for the HTTP connection. In non-HTTP connections additional information, such as MAC addresses, IP addresses, relative addresses, and/or other indications may be used to indicate where the connection is to occur. The page 800 may include an attribute field 820 for each attribute in which the display radio button 770 of FIG. 18 is selected. The attribute field 820 may be marked with the label from the label field 756 of FIG. 18. The input for the attribute field 820 may be set using the page 750. Any changes to the connection via the page 800 may be saved using the update button 822. A delete button 824 may be used to delete the connection and/or to cancel changes to the page 800.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system comprising:
   non-transitory memory; and
   one or more hardware processors configured to read instructions from the non-transitory memory to perform operations comprising:
      initiating an action that utilizes a remote connection;
      selecting an alias type based at least in part on a characteristic of the remote connection indicated in a type field, wherein the characteristic comprises an endpoint for the remote connection being dynamic or the endpoint for the remote connection comprising a static address;
      selecting a table from a plurality of tables based at least in part on the selected alias type;
      requesting information from the selected table using an alias having the alias type; and
      responsive to the request, receiving the information.

2. The system of claim 1, wherein the characteristic of the remote connection comprises the endpoint for the remote connection being dynamic and determined at runtime, the alias type is a credential-type alias, and the information comprises credentials.

3. The system of claim 2, wherein requesting the information comprises sending a request to a credential factory, receiving the information comprises receiving the information from the credential factory, and receiving the information comprises receiving credentials for the remote connection.

4. The system of claim 3, wherein the credential factory comprises a discovery server, wherein the discovery server is configured to:
   discover information about configuration items from the configuration items using a configuration item discovery process;
   generate a service map of the discovered configuration items and related connections; and
   store the service map in a configuration management database.

5. The system of claim 1, wherein the characteristic of the remote connection comprises the endpoint for the remote connection being persistent, and the alias type is a connection-type alias.

6. The system of claim 5, wherein the static address comprises a static IP address.

7. The system of claim 5, wherein requesting the information comprises sending a request to a connection factory, receiving the information comprises receiving the information from the connection factory, and receiving the information comprises receiving connection information about the endpoint including credentials for the remote connection.

8. The system of claim 7, wherein the connection factory comprises an application server.

9. The system of claim 7, wherein the connection factory comprises a discovery server configured to discover information about configuration items using a configuration item discovery process.

10. The system of claim 1, wherein the operations comprise establishing the remote connection using the information.

11. A method, comprising:
   receiving an alias, from a remote device, wherein the alias has a type field corresponding to a type of the alias;
   determining whether the alias is valid;
   responsive to the alias being valid:
      selecting a table from a plurality of tables based on the type of the alias, wherein the type of alias corresponds to the connection having a dynamic endpoint that is determined at runtime or a static end point that comprises a static address for the connection to the remote device being determined before runtime;
      searching for a record in the selected table based at least in part on the alias and the type of the alias; and
      responsive to finding the record, sending the record to the remote device.

12. The method of claim 11, wherein receiving the alias comprises receiving the alias at an application server.

13. The method of claim 11, wherein receiving the alias comprises receiving the alias at a discovery server configured to discover information about configuration items using a configuration item discovery process.

14. The method of claim 13, comprising pre-caching the record in local memory of the discovery server.

15. The method of claim 11, wherein the type of the alias comprises:
   a connection type when an endpoint associated with the alias is a static IP address; or
   a credential type when the endpoint is determined dynamically at runtime.

16. The method of claim 15, wherein the connection type includes a hostname for the endpoint and credentials to connect to the endpoint.

17. The method of claim 15, wherein the credential type includes only credentials for a connection.

18. Non-transitory, tangible, and computer-readable medium comprising instructions configured to cause one or more hardware processors to:
   initiate an action that utilizes a remote connection;
   determine whether an endpoint associated with the remote connection comprises a static address or an address that is dynamically determined at runtime;
   when the endpoint comprises a static address:
      select an alias as a connection type;
      request connection information from a connection factory accessing a first table using the alias; and
      receive the connection information including connection credentials;
   when the address is dynamically determined at runtime:
      select the alias as a credential type;
      request credential information from a credential factory accessing a second table using the alias; and
      receive the credential information.

19. The non-transitory, tangible, and computer-readable medium of claim 18, wherein requesting the connection information or requesting the credential information from a discovery server or an application server, wherein the discovery server is configured to discover information about configuration items using a configuration item discovery process.

20. The non-transitory, tangible, and computer-readable medium of claim 18, wherein the static address comprises a static IP address.

* * * * *